(12) United States Patent
Karim

(10) Patent No.: US 7,791,032 B2
(45) Date of Patent: Sep. 7, 2010

(54) MULTI-MODE DIGITAL IMAGING APPARATUS AND SYSTEM

(75) Inventor: Karim S. Karim, Coquitlam (CA)

(73) Assignee: Simon Fraser University, British Columbia (CA)

(*) Notice: Subject to any disclaimer, the term of this patent is extended or adjusted under 35 U.S.C. 154(b) by 304 days.

(21) Appl. No.: 10/567,832

(22) PCT Filed: Aug. 12, 2004

(86) PCT No.: PCT/CA2004/001457

§ 371 (c)(1),
(2), (4) Date: Dec. 18, 2006

(87) PCT Pub. No.: WO2005/015639

PCT Pub. Date: Feb. 17, 2005

(65) Prior Publication Data

US 2007/0187609 A1    Aug. 16, 2007

(30) Foreign Application Priority Data

Aug. 12, 2003   (CA)   ................................. 2437047
Dec. 2, 2003    (CA)   ................................. 2450425

(51) Int. Cl.
H01L 27/146    (2006.01)
(52) U.S. Cl. ................................................. 250/370.09
(58) Field of Classification Search ............. 250/370.09
See application file for complete search history.

(56) References Cited

U.S. PATENT DOCUMENTS 5,083,016 A * 1/1992 Wyles et al. .............. 250/208.1

(Continued)

FOREIGN PATENT DOCUMENTS

WO    WO 96/34416    10/1996

(Continued)

OTHER PUBLICATIONS

Karim, K. S., et al., "Amorphous Siicon Active Pixel Sensor Readout Circuit for Digital Imaging", IEEE Trans. On Electron Devices, vol. 50, No. pp. 200-208 (2003).

(Continued)

*Primary Examiner*—David P Porta
*Assistant Examiner*—Mark R Gaworecki
(74) *Attorney, Agent, or Firm*—Gilberto M. Villacorta; Walter K. Robinson; Foley & Lardner LLP

(57) ABSTRACT

The present invention provides digital imaging architectures comprising detectors coupled to readout circuitry. The readout circuitry functions in particular modes, the use of which can depend on characteristics of the input signals transferred to the readout circuitry from the detectors, or can depend on the characteristics of the output signal required from the readout circuitry. When the input signal has a particular magnitude the readout circuitry can function in a first mode in which the input signal can be amplified to a measurable level, and when the input signal has another magnitude, the readout circuitry can function in an alternate mode in which the input signal can be read out with a different or no amplification. Thus, the present invention can provide a large dynamic range of detection that can amplify sensitive input signals from a detector as well as read larger signals with little or no amplification.

20 Claims, 15 Drawing Sheets

U.S. PATENT DOCUMENTS

| | | | |
|---|---|---|---|
| 5,665,959 | A | 9/1997 | Fossum et al. |
| 5,892,540 | A | 4/1999 | Kozlowski et al. |
| 5,962,856 | A | 10/1999 | Zhao et al. |
| 5,981,932 | A | 11/1999 | Guerrieri |
| 6,130,423 | A | 10/2000 | Brehmer et al. |
| 6,194,740 | B1 * | 2/2001 | Zhang et al. .................. 257/59 |
| 6,486,504 | B1 | 11/2002 | Guidash |
| 7,573,518 | B2 | 8/2009 | Nakamura et al. |
| 2002/0134918 | A1 | 9/2002 | Takashi |
| 2002/0154225 | A1 | 10/2002 | Matsumoto et al. |
| 2002/0171773 | A1 | 11/2002 | Gower et al. |
| 2002/0190215 | A1 | 12/2002 | Tashiro et al. |
| 2006/0146159 | A1 | 7/2006 | Farrier |
| 2009/0268070 | A1 | 10/2009 | Hosier |

FOREIGN PATENT DOCUMENTS

| | | |
|---|---|---|
| WO | WO 96/34416 A1 | 10/1996 |
| WO | WO 96/05659 | 2/1997 |
| WO | WO 97/05659 A1 | 2/1997 |
| WO | WO 00/19706 | 4/2000 |
| WO | WO 02/067337 A2 * | 8/2002 |
| WO | WO 03/073507 | 9/2003 |

OTHER PUBLICATIONS

Karim, K. S., et al., "On-Pixel Amorphous Silicon Amplifier for Digital Imaging," in Integrated Opto-electronics, M. J. Deen, D. Misra, J. Ruzyllo, Editors, The Electrochemical Society Proceedings, vol. PV2002-4, pp. 313-332 (2002).

Huang, Zhong-Shou, et al., "Temperature dependence of the output of a stacked and amplified image sensor", J. Journal of Appied Physics, vol. 29, No. 2, part 2, pp. L240-L242 (1990).

Kavadias, et al., "A Logarithmic Response CMOS Image Sensor with On-Chip Calibration," *IEEE Journal of Sold-State Circuits*, vol. 35, No. 8, 2000.

Karim, et al., "On-Pixel Amorphous Silicon Amplifier for Digital Imaging in Integrated Optoelectroncis," Deen, et al., editors; *The Electrochemical Society, Proc.*, vol. PV2002-4, May 2002, pp. 313-332.

Karim, et al., "High Dynamic Range Pixel Architectures for Diagnostic Medical Imaging in Medical Imaging," *Physics of Medical Imaging, SPIE*, vol. 5368, 2004, pp. 657-667.

Sanaie-Fard, et al., "High Dynamic Range Pixel Amplifier Architecture in Amorphous Silicon Technology for Diagnostic X-Ray Imaging Applications," *106th Meeting of the Electrochemical Society: Thin Film Transistor Technologies VIII (TFTTVII)*, PV 2004-15, pp. 289-300.

Taghibakhsh, et al., "High Dynamic Range 2-FT Amplified Pixel Sensor Architecture for Digital Mammography Tomosynthesis," *IET Circuits Devices & Systems*, vol. 1, No. 1, 2007, pp. 87-92.

Taghibakhsh, et al., "Amplified Pixel Sensor Architecture for Low Dose Computed Tomography Using Silicon Thin Film Technology," *Proceedings of SPIE*, vol. 6510, 2007.

Karim, et al., "Alternate Pixel Architectures for Large Area Medical Imaging," Antonuk, et al., editors; *Medical Imaging 2001: Physics of Medical Imaging, Proceedings of SPIE*, vol. 4320, 2001, pp. 35-46.

Karim, et al., "Active Pixel Sensor Architectures in a-SiH for Medical Imaging," *J. Vac. Sci. Technol. A*, vol. 20, No. 3, May 2002, pp. 1095-1099.

Karim, et al., "Amorphous Silicon Pixel Amplifier with DeltaVT Compensation for Low Noise Digital Fluoroscopy," *International Electron Devices Meeting*, Digest, 2002, pp. 215-218.

U.S. Appl. No. 11/577,637, filed May 9, 2008, Karim, et al.

U.S. Appl. No. 12/207,871, filed Sep. 10, 2008, Karim, et al.

\* cited by examiner

MULTI-MODE DIGITAL IMAGING APPARATUS AND SYSTEM

FIELD OF THE INVENTION

The present invention pertains to the field of digital imaging, and in particular, to multi-mode digital imaging apparatus and system.

BACKGROUND

Active matrix flat-panel imagers (AMFPIs) have gained considerable significance in digital imaging, and more recently in diagnostic medical imaging applications, in view of their large area readout capability. The pixel, forming the fundamental unit of the active matrix, comprises a detector and readout circuit to efficiently transfer the collected electrons to external electronics for data acquisition. The pixel architecture most commonly used for large area x-ray imaging is the passive pixel sensor (PPS) shown in FIG. 1a. Here, a detector, for example, an amorphous selenium (a-Se) based photoconductor or a Cesium Iodide (CsI) phosphor coupled to an amorphous silicon (a-Si:H) p-i-n photodiode, is integrated with a readout circuit comprising an a-Si:H thin-film transistor (TFT) switch. Signal charge is accumulated on the pixel capacitance during an integration cycle and is transferred to an external charge amplifier via the TFT switch during a readout/reset cycle. This capacitance is the p-i-n photodiode capacitance or an integrated storage capacitor for the a-Se photoconductor arrangement. FIG. 1b shows a timing diagram for one sequence of operation of a PPS pixel. Cycle 110 and 120 represent the integration cycle and readout/reset cycle, respectively. Other sequences are possible, for example, where double sampling mechanisms are introduced, wherein, double sampling mechanisms are typically used to correct for the effect of non-uniformities within the circuitry. These non-uniformities may comprise process non-uniformities in the form of offsets, and, in the case of a-Si:H technology, non-uniformities in pixel circuit performance due to transistor instability. For example, International Publication Nos. WO9634416 and WO9705659 further disclose flat-panel detectors for radiation imaging using a PPS architecture.

While the PPS has the advantage of being compact and thus amenable to high-resolution imaging, reading a small output signal of the PPS for low input, real-time, large area applications, such as low dose fluoroscopy, requires high performance charge amplifiers. These charge amplifiers can potentially introduce noise that degrades the signal-to-noise ratio (SNR) at low signal levels thus undermining the pixel dynamic range. In particular, fluoroscopy can be one of the most demanding applications for flat-panel imaging systems due to the requirement of real-time readout. Real-time x-ray imaging or fluoroscopy is used in many medical interventional procedures where a catheter is moved through the arterial system under x-ray guidance. The technical challenge to be 10 addressed for these types of fluoroscopy is the need for extremely low noise, or alternatively, an increase in signal size before readout. Studies on a-Si:H PPS pixels suggest that an improvement in SNR of an order of magnitude is desirable in order to apply these systems to more advanced imaging applications.

One approach for improved SNR is disclosed in International Publication No. WO02067337 which discloses that the SNR can be increased by employing in-situ, or pixel, amplification via an a-Si:H current-mediated active pixel sensor (C-APS) as depicted in FIG. 2a. The gain, linearity and noise results reported show an improvement and indicate that the a-Si:H C-APS, coupled together with an established 20 x-ray detection technology such as a-Se or CsI/p-i-n photodiodes, can meet the stringent noise requirements for digital x-ray fluoroscopy, which is less than 1000 electrons of noise.

To perform amplification of a small, noise vulnerable, input signal, such as in fluoroscopy, the C-APS pixel can be used in three operating cycles; a reset cycle, an integration cycle and a readout cycle. FIG. 2b illustrates a timing diagram for a method of operating the C-APS readout circuit employing a double sampling mechanism. In this sequence, during the integration cycle 210, READ transistor 24 and RESET transistor 21 are kept OFF while AMP_RESET transistor 27 is kept ON. Photons incident upon detector 22 result in the generation of electron-hole pairs that discharge, or charge, the capacitance $C_{DETECTOR}$ at node 201 and thus reduce, or increase, the voltage at node 201, $V_G$, by an amount $\Delta V_G$. $C_{DETECTOR}$ mainly comprises the detector 22 capacitance and any storage capacitors that may be used.

The readout cycle 220 follows the integration cycle 210 and during this cycle, READ transistor 24 is turned ON, RESET transistor 21 is kept OFF and the AMP_RESET transistor 27 is turned OFF, resulting in a current, $I_{BIAS} \pm \Delta I_{BIAS}$, that is proportional to $V_G \pm \Delta V_G$ flowing in the AMP transistor 23 and READ transistor 24 branch. The current, $I_{BIAS} \pm \Delta I_{BIAS}$ is then integrated by charge amplifier 25 to obtain and store an output voltage, $V_{OUT1}$, on the amplifier feedback capacitor 26.

The reset cycle 230 occurs subsequent to the readout cycle 220 where RESET transistor 21 is pulsed ON and $C_{DETECTOR}$ is charged, or discharged, to reset the voltage at node 201 to $V_G$ while RESET transistor 21 is ON. During this reset cycle, READ transistor 24 is turned OFF and AMP_RESET transistor 27 is turned ON.

To perform the double sampling operation, an additional read cycle 240 follows the reset cycle 230 where again READ transistor 24 is turned ON, RESET transistor 21 is turned OFF and AMP_RESET transistor 27 is turned OFF. $I_{BIAS}$ is integrated by charge amplifier 25 to obtain and store an output voltage, $V_{OUT2}$, on feedback capacitor 26. Subtracting $V_{OUT1}$ from $V_{OUT2}$ yields a $\Delta V_{OUT}$ that can be free from non-uniformities and is proportional to $\Delta V_G$.

$\Delta I_{BIAS}$ is proportional to $\Delta V_G$ and is given as:

$$\Delta I_{BIAS} = g_m \Delta V_G$$

where $g_m$ is the transconductance of the AMP transistor 23 and READ transistor 24 readout circuit branch.

The C-APS produces a charge gain, $G_i$, to amplify the noise vulnerable input signal. The $G_i$ for the C-APS is given as:

$$G_i = (g_m T_S)/C_{DETECTOR}$$

where $T_S$ is the amount of time $I_{BIAS}$ and $\Delta I_{BIAS}$ are integrated on the feedback capacitor 26. As indicated by the equation above, $G_i$ is programmable via $g_m$, $T_S$ and the choice of an appropriate $C_{DETECTOR}$.

A concern with the C-APS circuit is the presence of a small-signal linearity constraint on the x-ray input signal. Using such a pixel amplifier for real-time fluoroscopy, where the exposure level is small, is feasible since the voltage change at the amplifier input is also small and in the order of mV. However, in applications such as digital chest radiography, mammography or higher dose fluoroscopy, the voltage change at the amplifier input can be much larger due to the larger x-ray exposure levels, which cause the C-APS pixel output to be non-linear thus reducing the pixel dynamic range. Another consequence of a non-linear pixel transfer function is that the standard double sampling mechanism cannot be implemented in hardware due to this non-linearity.

Furthermore, an additional shortcoming of the C-APS pixel is that the presence of a large output current, causes the external or off-panel charge amplifier to saturate. Large pixel output currents can also occur when a large charge gain is required since $g_m$ is proportional to $I_{BIAS}$.

Another approach disclosed in International Publication No. WO02067337 reports a near-unity gain pixel amplifier, namely, an a-Si:H voltage-mediated active pixel sensor (V-APS). A V-APS architecture is illustrated in FIG. 3. READ transistor 34, AMP transistor 33 and RESET transistor 31 are components of the V-APS pixel and function in a similar manner as in the C-APS pixel. Resistive load 35 is connected to the pixel output node to convert the current in the AMP transistor 33 and READ transistor 34 branch into an output voltage. Resistive load 35 can comprise a resistor load device or a transistor load device. The input signal voltage $V_G$ is translated to a pixel output voltage $V_{OUT}$ with a near unity gain. The V-APS, like the C-APS, can be used in three operating cycles; a reset cycle, an integration cycle and a readout cycle. Like the C-APS, double sampling mechanisms can be applied to the V-APS to correct for the effect of non-uniformities within the circuitry. A problem with the V-APS architecture is that essentially no gain is provided to the input signal. In addition, with current state of the art amorphous silicon technology, it is difficult to achieve real time readout using this architecture when large column bus capacitances are charged and discharged.

Therefore, a pixel design that is able to achieve real-time readout as well as capable of sensing a wider range of input signals is necessary while accounting for large pixel output currents in order to achieve high gain.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a multi-mode digital imaging apparatus and system. In accordance with an aspect of the present invention, there is provided a digital imaging apparatus comprising: a detector for generating a first signal in response to photons incident thereupon; and multimode readout circuitry coupled to said detector for receiving said first signal and for generating a second signal representative of said first signal, said multimode readout circuitry switchable between two or more modes of operation, a desired mode of operation determined based on characteristics of said first signal.

In accordance with another aspect of the invention, there is provided a digital imaging system comprising an array of digital imaging apparatuses, each digital imaging apparatus comprising: a detector for generating a first signal in response to photons incident thereupon; and multimode readout circuitry coupled to said detector for receiving said first signal and for generating a second signal representative of said first signal, said multimode readout circuitry switchable between two or more modes of operation, a desired mode of operation determined based on characteristics of said first signal.

In accordance with another aspect of the invention, there is provided a digital imaging apparatus comprising: a detector for generating a first signal in response to photons incident thereupon; and readout circuitry coupled to the detector for generating a second signal representative of said first signal, said readout circuitry including a current subtraction circuit for generating a desired signal, said readout circuitry combining said second signal and said desired signal, and said readout circuitry generating a third signal representative of the combined second signal and desired signal.

In accordance with another aspect of the present invention there is provided a method for digital imaging comprising the steps of: detecting by a detector photons incident thereupon; generating by the detector a first signal in response to the photons; receiving said first signal by multimode readout circuitry coupled to the detector; generating a second signal representative of the first signal by the multimode readout circuitry, said multimode readout circuitry switchable between two or more modes of operation, a desired mode of operation determined based on characteristics of said first signal; and transferring said second signal to a digital signal processor.

In accordance with another aspect of the present invention there is provided a method for digital imaging comprising the steps of: detecting by a detector photons incident thereupon; generating by the detector a first signal in response to the photons; receiving said first signal by readout circuitry coupled to the detector; generating a second signal representative of the first signal by the readout circuitry, said readout circuitry including a current subtraction circuit for generating a desired signal; combining said second signal and said desired signal; generating a third signal representative of the combined second signal and desired signal; transferring said third signal to a digital signal processor.

BRIEF DESCRIPTION OF THE FIGURES

FIG. 1b illustrates an example of a timing diagram for the PPS of FIG. 1a.

FIG. 2b illustrates an example of a timing diagram for the CAPS of FIG. 2a.

FIG. 4b illustrates an example of a timing diagram for the embodiment of FIG. 4a.

FIG. 5b illustrates an example of a timing diagram for the embodiment of FIG. 5a.

FIG. 7b illustrates an example of a timing diagram for the embodiment of FIG. 7a.

DETAILED DESCRIPTION OF THE INVENTION

Definitions

Figure 1A:
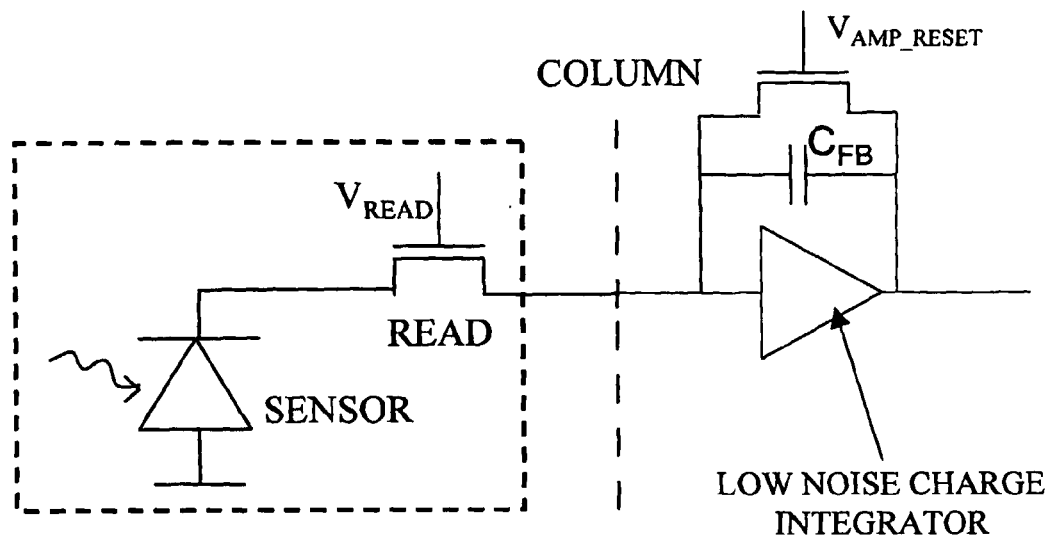
FIG. 1a illustrates a passive pixel sensor (PPS) according to the prior art.
Figure 1B:
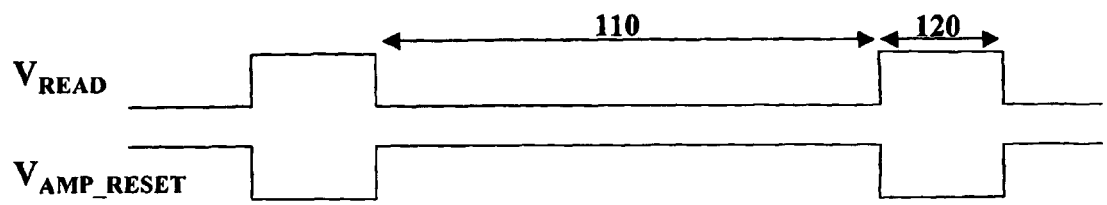

The term "detector" is used to define a device that converts photons of radiation in any region of the electromagnetic spectrum to electrical charge.

The term "sensor" is used to define the combination of one or more detectors and readout circuitry.

The term "unity gain" is used to define current or voltage gain, such that the output signal obtained as a result of the gain being applied to an input signal has the same magnitude or a different magnitude than the input signal.

Unless defined otherwise, all technical and scientific terms used herein have the same meaning as commonly understood by one of ordinary skill in the art to which this invention belongs.

The present invention provides digital imaging architectures comprising detectors coupled to readout circuitry, wherein the readout circuitry functions in particular modes, the use of which can depend on characteristics of the input signals transferred to the readout circuitry from the detectors, or can depend on the characteristics of the output signal required from the readout circuitry. Each detector generates photo-carriers in response to photons incident upon the detector and produces charge, which results in a voltage change across the detector. This voltage change produces the input signal to the readout circuitry, which then outputs a current or charge representative of the input signal. For example, when the input signal has a particular magnitude the readout circuitry can function in a first mode in which the input signal can be amplified to a measurable level, and when the input signal has another magnitude, the readout circuitry can function in an alternate mode in which the input signal can be read out with a different or no amplification. For implementations of the present invention in applications such as low dose fluoroscopy, high dose fluoroscopy chest radiography and mammography, two modes can provide a sufficient dynamic range for these x-ray detection techniques, or other detection techniques as would be readily understood. However, additional modes can be implemented to provide various levels of amplification to the input signal, for example, three or more modes of operation of the readout circuitry can be implemented. Furthermore, more than one mode can be used to read out the same input signal. In some embodiments, selection of the mode of operation of the readout circuitry may be actuated manually or automatically. For example, an automated switching system can comprise a feedback circuit enabling automatic selection of an appropriate mode of operation of the readout circuitry, or a pre-programmed sequence to enable automatic selection of an appropriate mode of operation of the readout circuitry, or any other means of enabling automatic selection of an appropriate mode of operation of the readout circuitry as would be readily understood. Thus the digital imaging apparatus and system of the present invention can provide a large dynamic range of detection that can be capable of amplifying sensitive input signals from a detector to improve the noise immunity of the input signals to external noise sources as well as capable of reading larger signals with little or no amplification, both with a fast pixel readout time.

Embodiments of the present invention also provide a means of further increasing the dynamic range of detection by implementing a current subtraction circuit in the readout circuitry. This current subtraction circuit can be used to reduce the total amount of current flowing through parts of the readout circuitry which can saturate, for example, when a large charge gain is used. Reducing the total output current can result in an increase in the dynamic range of the sensor by allowing smaller input signals to be detected by enabling greater amplification of the input signals.

Each pixel typically comprises one detector, however it is contemplated that more than one detector may be present within each pixel. In addition, the readout circuitry may be partially present within the on-panel pixels and partially present off the imaging panel, or substantially present on the imaging panel. The imaging panel may be rigid, for example comprising a glass substrate, or flexible, for example comprising a flexible plastic or flexible metal substrate. In addition, the present invention may comprise more than one imaging panel. For example, one panel may comprise some parts of the sensor and another panel may comprise other parts of the sensor. Furthermore, the pixel electronics may be fabricated on a single chip or on multiple chips. Furthermore, the readout circuitry present within a pixel may be physically located in the same plane as the detector or this readout circuitry may be embedded under, or fabricated above, the detector to provide a high fill factor.

Portions of the readout circuitry that are common for a column, row, or group of pixels may be multiplexed between these pixels in an array. Thus it would be readily understood by a worker skilled in the art, that in the various embodiments of the present invention, common column, row or group readout circuitry may be multiplexed between pixels, and that this may require additional circuitry, for example switching circuits or multiplexing circuits. In addition, multiplexers may also be used to reduce the readout circuit complexity by decreasing the total number of amplifiers, for example, required for a column, row, or group of pixels. Furthermore, common column or row readout circuitry may also be implemented such that the common readout circuitry is individual to each pixel. It would also be understood that the pixels of various embodiments may be implemented in arrays of any size. Furthermore, where portions of readout circuitry have been identified as being shared by one or more columns of pixels, it should be understood that the circuitry may equivalently be shared by one or more rows of pixels or one or more other groups of pixels.

Embodiments of the present invention can be operated with various switching and timing sequences. For example, where a double sampling technique is used, the transistor switching and timing may vary from a sequence in which no double sampling technique is used. In various embodiments of the present invention described herein, related transistor switching and timing cycles and sequences are provided as examples, and numerous other cycles and sequences are possible as would be obvious to a worker skilled in the art.

The detector may be any type of detector, for example, solid-state photodetectors such as a-Si:H, amorphous selenium or cadmium zinc telluride based detectors or any other appropriate detector. In addition, direct detection based detectors such as molybdenum Schottky diodes, as well as indirect detection detectors such as those comprising phosphors for example gadolinium oxysulfide detectors, or caesium iodide detectors, may also be used. Any other types of detectors for x-ray detection may further be used as would be readily understood by a worker skilled in the art. The transistors used in various embodiments of the present invention may be amorphous silicon (a-Si:H) thin-film transistors (TFTs), poly-crystalline silicon TFTs, micro-crystalline silicon TFTs, nano-crystalline silicon TFTs, crystalline silicon transistors, or any other similar device as would be readily understood by a worker skilled in the art. In further embodiments, radiation in any region of the electromagnetic spectrum may be detected using the present invention with the selection of detectors, and devices for the readout circuitry being made in order that an appropriate portion of the electromagnetic spectrum can be detected as would be readily understood by a worker skilled in the art.

As would be readily understood by a worker skilled in the art, the present invention may be applied to any digital imaging application. For example, the present invention may be applied to medical imaging, x-ray inspection systems such as in the inspection of aircraft wings, security systems such as screening of luggage at airports, non-destructive material tests, radiography or optical imaging, as well as other forms of digital imaging applications as would be readily understood.

Figure 4A:
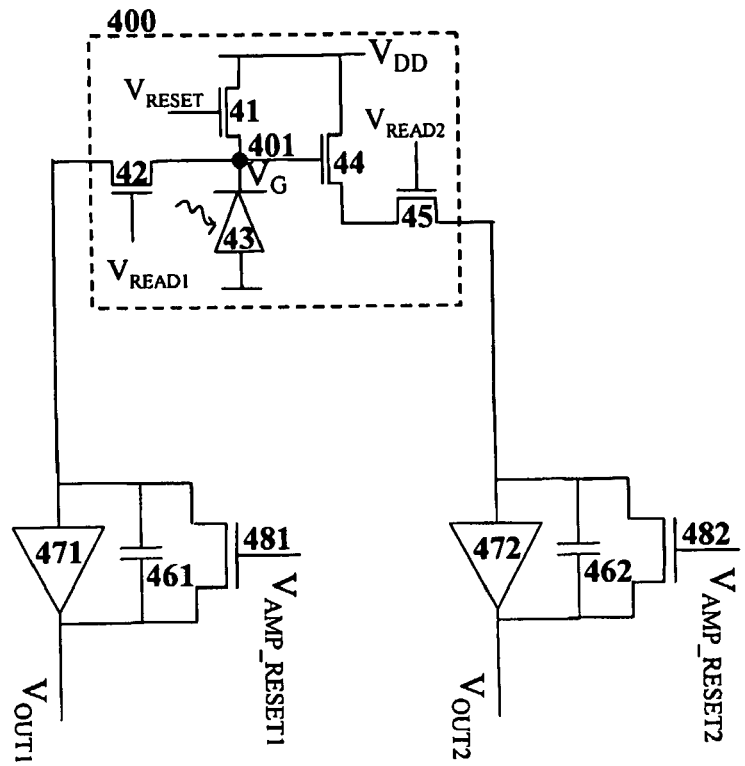
FIG. 4a illustrates a four transistor pixel, dual mode implementation of one embodiment of the present invention.

FIG. 4a illustrates an imaging architecture according to one embodiment of the present invention. In this embodiment, the readout circuitry can function in an amplification mode when the input signal can be relatively small, for example in applications such as low dose, real-time, x-ray fluoroscopy, and can function in a unity gain mode when the input signal can be relatively large, for example in higher contrast imaging applications like higher energy, real-time, x-ray fluoroscopy or chest radiography. In the embodiment of FIG. 4a, RESET transistor 41, READ1 transistor 42, detector 43, AMP transistor 44, and READ2 transistor 45 are present within each pixel 400 on the imaging panel. Charge integrator 471, charge integrator 472, feedback capacitor 461, feedback capacitor 462, AMP_RESET1 transistor 481, and AMP_RESET2 transistor 482 form part of the readout circuitry and are used to read out signals from the pixel, and may be off-panel components or on-panel components.

The input signal from detector 43 can be read out using either the amplification or unity gain mode, or both of these modes. Both the amplification mode and the unity gain mode can be used to readout the same input signal since during the amplification mode the signal readout is essentially 'non-destructive' to the input signal, and therefore the input signal can remain available for subsequent readout in the unity gain mode. Due to the 'destructive' nature of the readout during the unity gain mode, this mode of readout is typically performed subsequent to the amplification mode readout. To operate the sensor solely in the amplification mode for small, noise vulnerable, input signal acquisition, READ1 transistor 42 is kept OFF. In this mode, the readout circuitry can function in a reset, integration and readout cycle. To operate the sensor solely in the unity gain mode, READ2 transistor 45 and RESET transistor 41 are kept OFF and the readout circuitry can function in a reset/readout cycle and an integration cycle.

Figure 4B:
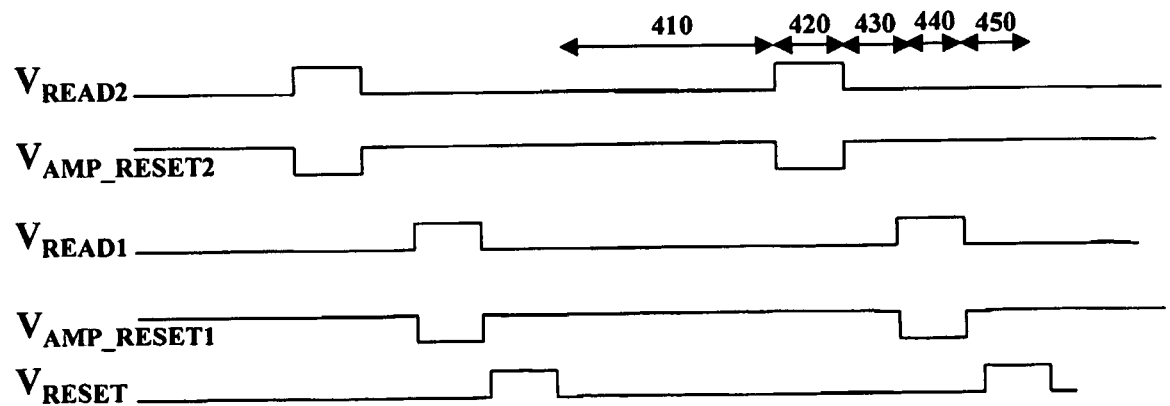

FIG. 4b illustrates an example of a timing diagram for a sequence in which each input signal from detector 43 is read out in the amplification mode followed by the unity gain mode. In this sequence, five cycles are used, namely, an integration cycle 410, an amplification mode readout cycle 420, a charge amplifier reset cycle 430, a unity gain mode readout cycle 440 and a reset cycle 450. As would be readily understood by a worker skilled in the art, subsequent signal processing methods can be used to interpret the readout circuitry output signals. For example, where the input signal is outside the dynamic range of a particular mode, this would be appropriately interpreted by the signal processing means.

During the integration cycle 410, READ1 transistor 42, READ2 transistor 45 and RESET transistor 41 are kept OFF while AMP_RESET1 transistor 481 and AMP_RESET2 transistor 482 are kept ON. Photons incident upon detector 43 result in the generation of electron-hole pairs that discharge, or charge, the capacitance $C_{DETECTOR}$ of detector 43 and thus reduce, or increase, the voltage at node 401, $V_G$, by an amount $\Delta V_G$. $C_{DETECTOR}$ is the capacitance at node 401 and mainly comprises the detector capacitance and any storage capacitors that may be used, as would be readily understood by a worker skilled in the art.

The amplification mode readout cycle 420 follows the integration cycle 410 and during this amplification mode readout cycle, READ2 transistor 45 is turned ON, RESET transistor 41 is kept OFF, READ1 transistor 42 is kept OFF, AMP_RESET1 transistor 381 is kept ON and the AMP_RESET2 transistor 482 is turned OFF. Thus, a current, $I_{BIAS} \pm \Delta I_{BIAS}$, that is proportional to $V_G \pm \Delta V_G$ flows in the AMP transistor 44 and READ2 transistor 45 branch. The current, $I_{BIAS} \pm \Delta I_{BIAS}$ is then integrated by charge amplifier 472 to obtain and store an output voltage, $V_{OUT2}$ on the amplifier feedback capacitor 462. $V_{OUT2}$ represents the amplified input signal that can be subsequently recorded and manipulated by signal processors, as would be readily understood by a worker skilled in the art.

The charge amplifier reset cycle 430 follows the amplification mode readout cycle 420 where, during the charge amplifier reset cycle READ2 transistor 45 is turned OFF, RESET transistor 41 is kept OFF, READ1 transistor 42 is kept OFF, AMP_RESET1 transistor 481 is kept ON and the AMP_RESET2 transistor 482 is turned ON. Thus, the output for charge amplifier 472 is reset. The charge amplifier reset cycle may only be needed when there is an adjacent pixel that has multiplexed its READ1 transistor output with the READ2 transistor 45 output of the current pixel 400 as would be readily understood by a worker skilled in the art.

The unity gain mode readout cycle 440 follows the charge amplifier reset cycle 430 and during this unity gain mode readout cycle, READ1 transistor 42 is turned ON, RESET transistor 41 is kept OFF, READ2 transistor 45 is kept OFF, AMP_RESET2 transistor 482 is kept ON and AMP_RESET1 transistor 481 is turned OFF. Here, the voltage $V_G$ at node 401 is transferred and stored on the feedback capacitor 461 and appears as an output voltage $V_{OUT1}$. $V_{OUT1}$ represents the input signal with a unity gain that can be recorded by subsequent signal processors, as would be readily understood by a worker skilled in the art. In a further embodiment, some gain may be applied to the input signal in the unity gain mode by using appropriate values for feedback capacitor 461.

Note that in various embodiments of the present invention, multiple feedback capacitors can be associated with the amplifiers in the readout circuitry. These capacitors can have various capacitance values and be arranged in a parallel configuration and designed to be switch selectable to provide different required gains, as would be readily understood by a worker skilled in the art. Other methods of varying gain are also possible as would be readily understood.

The reset cycle 450 occurs subsequent to the unity gain mode readout cycle 440 where in this reset cycle RESET transistor 41 is pulsed ON and $C_{DETECTOR}$ is charged or discharged to reset the voltage at node 401 to $V_G$ while RESET transistor 41 is ON. During this reset cycle, READ1 transistor 42 is turned OFF, READ2 transistor 45 is kept OFF, AMP_RESET1 transistor 481 is turned ON and AMP_RESET2 transistor 482 is kept ON.

The pixel output in the embodiment of FIG. 4a can be linear for relatively small and large input signals, therefore the effect of non-uniformities in the imager fabrication process, transistor metastability, and external circuit non-uniformity can be mitigated by the use of standard double sampling and offset-and-gain correction techniques commonly applied in imaging as would be readily understood.

Figure 4C:
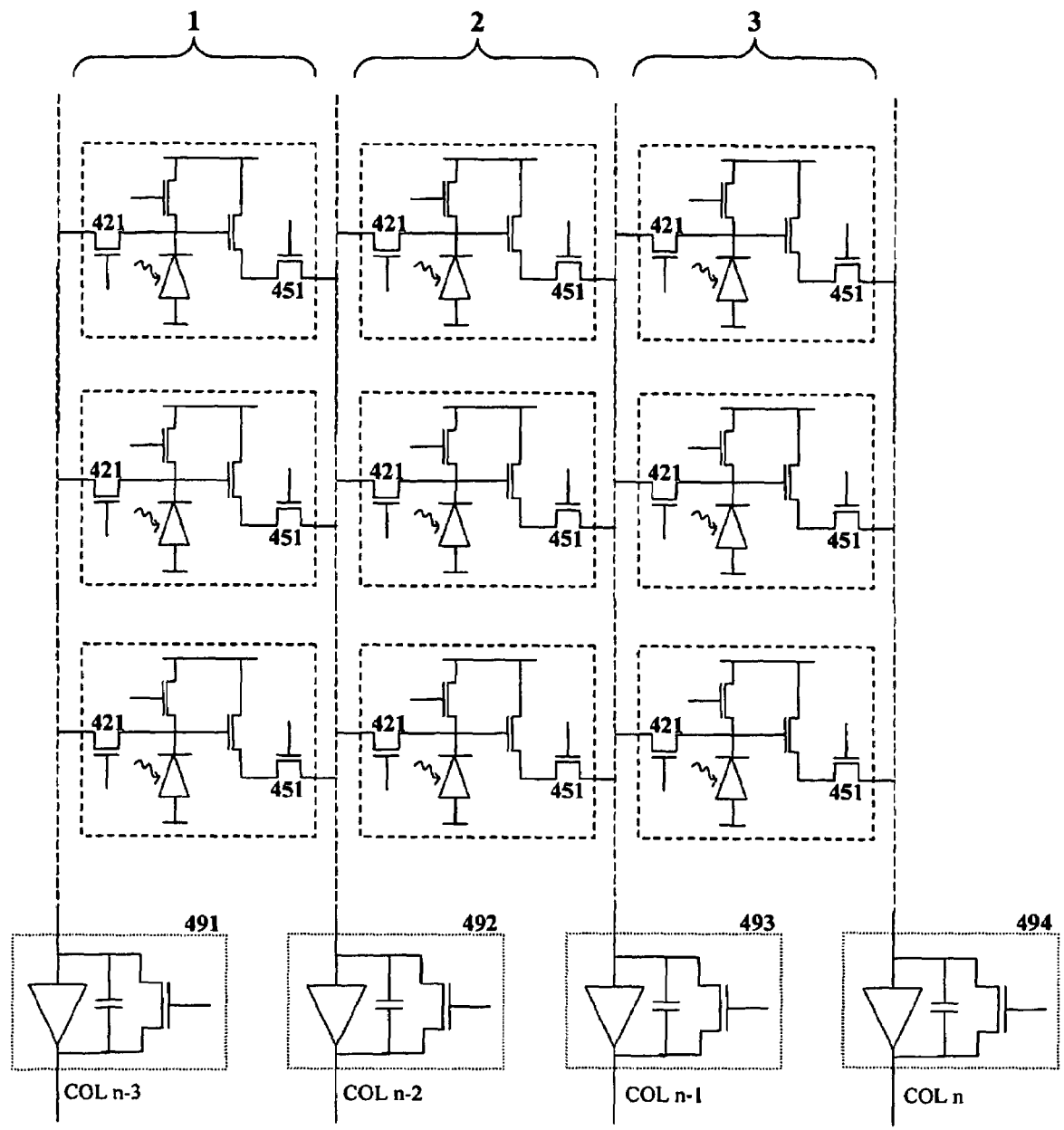
FIG. 4c illustrates the embodiment of FIG. 4a implemented in a 3×3 array according to one embodiment.

FIG. 4c illustrates the embodiment of FIG. 4a in a 3×3 active matrix imaging array. The column, or row, readout amplifier circuitry 492 and 493 are multiplexed between READ1 transistors 421 and READ2 transistors 451 of adjacent pixels. Readout amplifier circuitry 491 is connected to READ1 transistors 421 of column 1, and readout amplifier circuitry 494 is connected to READ2 transistors 451 of column 3. It would be readily understood that embodiments of the present invention may be implemented in arrays of any size. In addition, common column, or row, circuitry may be multiplexed between adjacent pixels, or by using additional multiplexers.

Figure 5A:
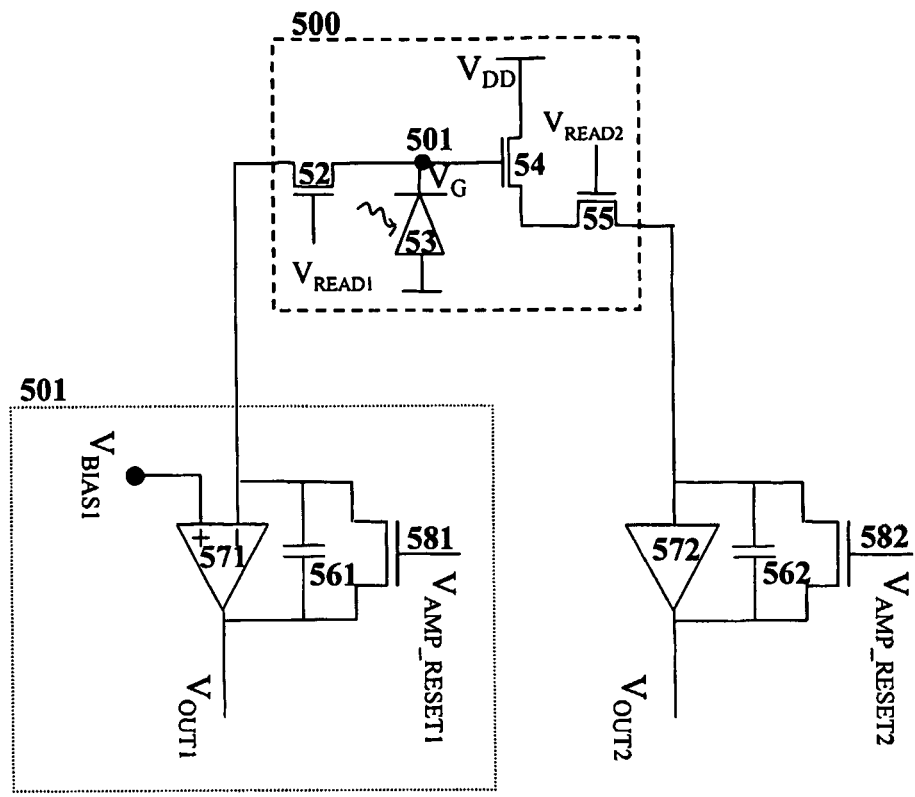
FIG. 5a illustrates a three transistor pixel, dual mode implementation of one embodiment of the present invention.

FIG. 5a illustrates an imaging architecture according to another embodiment of the present invention. This embodiment is similar to the embodiment of FIG. 4a, with the removal of RESET transistor 41. This architecture can provide the advantage of a smaller pixel size, less parasitic capacitance and faster readout times.

The readout circuitry can similarly function in an amplification mode when the input signal can be relatively small and can similarly function in a unity gain mode when the input signal can be relatively large.

In the embodiment of FIG. 5a, READ1 transistor 52, detector 53, AMP transistor 54, and READ2 transistor 55 are present within each pixel 500 on the imaging panel. Charge integrator 571, charge integrator 572, feedback capacitor 561, feedback capacitor 562, AMP_RESET1 transistor 581, and AMP_RESET2 transistor 582 form part of the readout circuitry and are used to read out signals from the pixel, and may be off-panel components or on-panel components.

The input signal from detector 53 can be read out using either the amplification or unity gain mode, or both of these modes. Again, both the amplification mode and the unity gain mode can be used to read out the same input signal since during the amplification mode the signal readout is 'non-destructive' to the input signal. Similarly, due to the substantially 'destructive' nature of the readout during the unity gain mode, the unity gain mode readout is typically performed subsequent to the amplification mode readout.

Figure 5B:
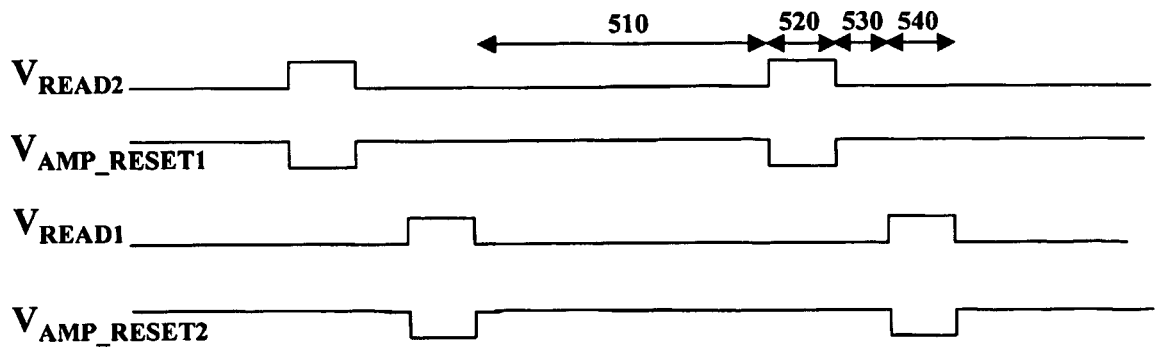

FIG. 5b illustrates an example of a timing diagram for a sequence in which each input signal from detector 53 is read out in the amplification mode followed by the unity gain mode. Here, four cycles are used in the sequence, namely, an integration cycle 510, an amplification mode readout cycle 520, a charge amplifier reset cycle 530, and a unity gain readout cycle 540.

During the integration cycle 510, READ1 transistor 52 and READ2 transistor 55 are kept OFF while AMP_RESET1 transistor 581 and AMP_RESET2 transistor 582 are kept ON. Photons incident upon detector 53 result in the generation of electron-hole pairs that discharge, or charge, the capacitance $C_{DETECTOR}$ of detector 53 and thus reduce, or increase, $V_G$ by an amount $\Delta V_G$. $C_{DETECTOR}$ is the capacitance at node 501 and mainly comprises the detector capacitance and any storage capacitors that may be used, as would be readily understood by a worker skilled in the art.

The amplification mode readout cycle 520 follows the integration cycle 510 and during this amplification mode readout cycle, READ2 transistor 55 is turned ON, READ1 transistor 52 is kept OFF, AMP_RESET1 transistor 581 is kept ON and the AMP_RESET2 transistor 582 is turned OFF. Thus, a current, $I_{BIAS} \pm \Delta I_{BIAS}$, that is proportional to $V_G \pm \Delta V_G$ flows in the AMP transistor 54 and READ2 transistor 55 branch. The current, $I_{BIAS} \pm \Delta I_{BIAS}$ is then integrated by charge amplifier 572 to obtain and store an output voltage, $V_{OUT2}$ on the amplifier feedback capacitor 562. $V_{OUT2}$ represents the amplified input signal that can be subsequently recorded and manipulated by signal processors, as would be readily understood by a worker skilled in the art.

The charge amplifier reset cycle 530 follows the amplification mode readout cycle 520 where, during the charge amplifier reset cycle READ2 transistor 55 is turned OFF, RESET transistor 51 is kept OFF, READ1 transistor 52 is kept OFF, AMP_RESET1 transistor 581 is kept ON and the AMP_RESET2 transistor 582 is turned ON. Thus, the output for charge amplifier 572 is reset. The charge amplifier reset cycle 530 may only be needed when there is an adjacent pixel that has multiplexed its READ1 transistor output with the READ2 transistor 55 output of the current pixel 500 as would be readily understood by a worker skilled in the art.

The unity gain mode readout cycle 540 follows the charge amplifier reset cycle 530 and during this unity gain mode readout cycle, READ1 transistor 52 is turned ON, READ2 transistor 55 is kept OFF, AMP_RESET2 transistor 582 is kept ON and AMP_RESET1 transistor 581 is turned OFF. READ1 transistor 52 is multiplexed to both read out the input signal and reset the voltage $V_G$ at the pixel node 501 by setting $V_{BIAS}$ to an appropriate reset voltage such as $V_{DD}$ during the unity gain mode readout cycle 540. During all other cycles, $V_{BIAS}$ may be set to a voltage such as ground. During the unity gain mode readout cycle 540, the voltage $V_G$ at node 501 is transferred and stored on the feedback capacitor 561 and appears as an output voltage $V_{OUT1}$. $V_{OUT1}$ represents the input signal with a unity gain that may be subsequently recorded and manipulated by signal processors, as would be readily understood by a worker skilled in the art. In a further embodiment, some gain may be applied to the input signal in the unity gain mode by using appropriate values for feedback capacitor 561. Subsequent signal processing methods can be used to interpret the readout circuitry output signals.

The pixel output in this embodiment can also be linear for relatively small and large input signals, therefore the effect of non-uniformities in the imager fabrication process, transistor metastability, and external circuit non-uniformity can be mitigated by standard double sampling and offset-and-gain correction techniques commonly applied in imaging as would be readily understood.

Figure 6:
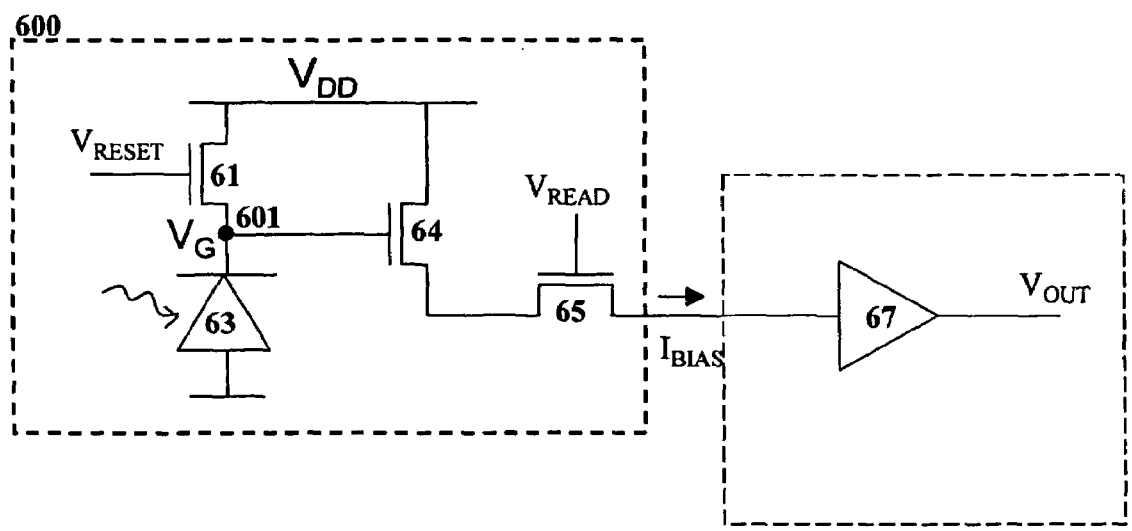
FIG. 6 illustrates a three transistor pixel, dual mode implementation of one embodiment of the present invention.

FIG. 6 illustrates an imaging architecture according to yet another embodiment of the present invention. Compared to the embodiment of FIG. 4a, this embodiment comprises one less on-pixel transistor. Having one less transistor can provide the advantage of a smaller pixel size and less parasitic capacitance yielding lower noise and a higher charge gain.

The readout circuitry in the embodiment of FIG. 6 can also function in an amplification mode when the input signal can be relatively small and can function in a unity gain mode when the input signal can be relatively large. Both the amplification mode and the unity gain mode can also be used to read out the same input signal since during both these modes the signal readout is essentially 'non-destructive' on the input signal. Thus, when reading out the signal using both modes, the amplification mode readout can be done prior to or after the unity gain mode readout. As would be readily understood by a worker skilled in the art, subsequent signal processing methods can be used to interpret the readout circuitry output signals.

An advantage of the unity gain mode in this embodiment is that it can be easily interfaced to on-panel or off-panel multiplexers with essentially no degradation in the signal. Therefore, this mode can be useful for applications where signal integrity is important.

In the embodiment of FIG. 6, RESET transistor 61, READ transistor 65, detector 63, and AMP transistor 64, are present within each pixel 600 on the imaging panel. The off-pixel reconfigurable circuit 67 can be shared by pixels in a single column, or row, and can further be multiplexed between adjacent pixels in an array, or by using additional multiplexers. Furthermore, reconfigurable circuit 67 may be off-panel or on-panel. Reconfigurable circuit 67 can be configured as a charge amplifier when this embodiment is used in the amplification mode and the reconfigurable circuit can be configured as a voltage amplifier, voltage buffer, or load circuit, when this embodiment is used in the unity gain mode in order to efficiently read out the input signal. For example, the reconfigurable circuit configured as a load circuit may be a TFT biased into the saturation region connected between the source terminal of READ transistor 65 and ground, a resistor connected between the source terminal of READ transistor 65 and ground, or any such device connected between the source terminal of READ transistor 65 and ground. As would be readily understood, various other implementations of the reconfigurable circuit 67 are possible in the unity gain mode.

When in the unity gain mode, the sensor architecture according to this embodiment exhibits a relatively large signal linearity and the pixel output can be linear in both the amplification and unity gain modes. Therefore, the effect of non-uniformities affecting the sensor can be mitigated by standard double sampling techniques commonly applied in imaging.

Figure 7A:
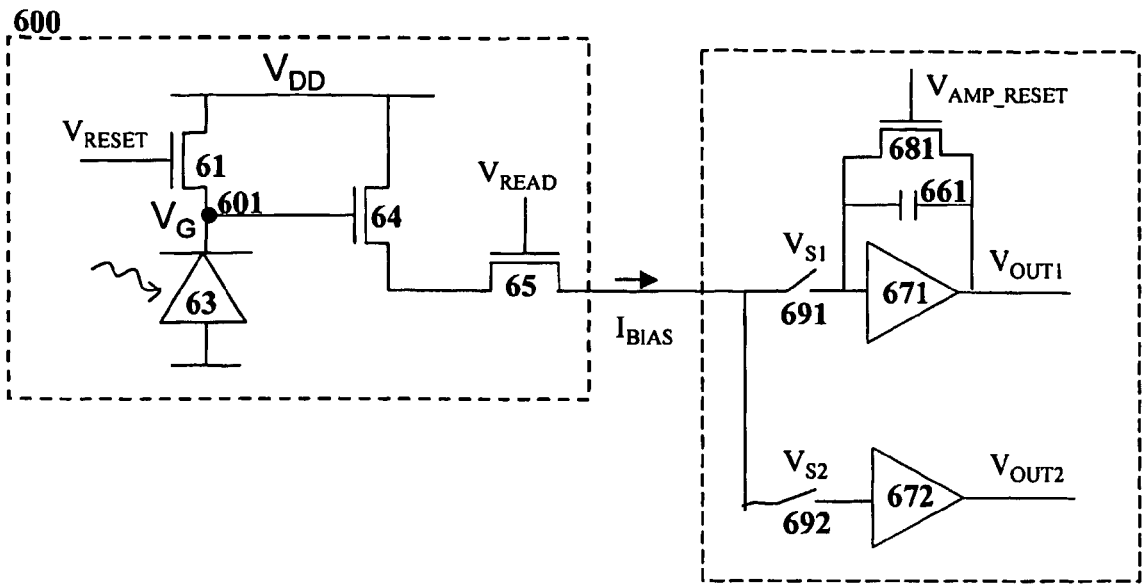
FIG. 7a illustrates a three transistor pixel, dual mode implementation of one embodiment of the present invention.

In one embodiment as illustrated in FIG. 7a, reconfigurable circuit 67 of FIG. 6 is implemented by a circuit comprising a charge amplifier 671 and a voltage amplifier 672, each of which can be activated using switches 691 and 692, when operating in the amplification mode and unity gain mode, respectively. In a further embodiment, the same amplifier may be used for both modes with appropriate circuitry implemented for switching, as would be readily understood.

The input signal from detector 63 can be read out using either the amplification mode or unity gain mode, or both these modes. For example, to operate the sensor solely in the amplification mode for small, noise vulnerable, input signal acquisition, switch transistor 692 is kept OFF while switch transistor 691 is kept ON. In this mode, the readout circuitry can function in a reset, integration and readout cycle. To operate the sensor solely in the unity gain mode, switch transistor 691 is kept OFF while switch transistor 692 and the readout circuitry can function in a reset, integration and readout cycle.

Figure 7B:
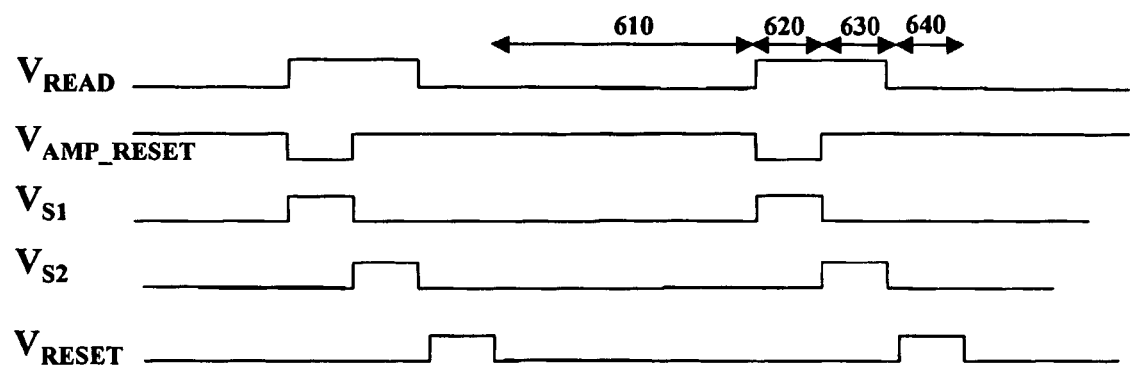

FIG. 7b illustrates an example of a timing diagram for a sequence in which each input signal from detector 63 is read out in the amplification mode followed by the unity gain mode. Here four cycles are used in the sequence, namely, an integration cycle 610, an amplification mode readout cycle 620, a unity gain mode readout cycle 630, and a reset cycle 640.

During the integration cycle 610, READ transistor 65 is kept OFF, RESET transistor 61 is kept OFF, switch transistor 691 is kept OFF, and switch transistor 692 is kept OFF, while AMP_RESET transistor 681 is kept ON. Photons incident upon detector 63 result in the generation of electron-hole pairs that discharge, or charge, the capacitance $C_{DETECTOR}$ of detector 63 and thus reduce, or increase, the voltage at node 601, $V_G$, by an amount $\Delta V_G$. $C_{DETECTOR}$ is the capacitance at node 601 and mainly comprises the detector capacitance and any storage capacitors that may be used, as would be readily understood by a worker skilled in the art.

The amplification mode readout cycle 620 follows the integration cycle 610 and during this amplification mode cycle, READ transistor 65 is turned ON, RESET transistor 61 is kept OFF, AMP_RESET1 transistor 681 is turned OFF, switch transistor 692 is kept OFF and switch transistor 691 is turned ON. Thus, a current, $I_{BIAS} \pm \Delta I_{BIAS}$, which is proportional to $V_G \pm \Delta V_G$ flows in the AMP transistor 64 and READ transistor 65 branch. The current, $I_{BIAS} \pm \Delta I_{BIAS}$ is then integrated by charge amplifier 671 to obtain and store an output voltage, $V_{OUT1}$ on the amplifier feedback capacitor 661. $V_{OUT1}$ represents the amplified input signal that can be subsequently recorded and manipulated by signal processors, as would be readily understood by a worker skilled in the art.

The unity gain mode readout cycle 630 follows the amplification mode readout cycle 620 and during this unity gain mode readout cycle, READ transistor 65 is kept ON, RESET transistor 61 is kept OFF, AMP_RESET transistor 681 is turned ON, switch transistor 691 is turned OFF and switch transistor 692 is turned ON. The voltage $V_G$ at node 601 is transferred to the output of the voltage amplifier 672 and appears as an output voltage $V_{OUT2}$. $V_{OUT2}$ represents the input signal with a unity gain that can be subsequently recorded and manipulated by signal processors. In a further embodiment, some gain may be applied to the input signal in the unity gain mode by appropriate design of the voltage amplifier.

The reset cycle 640 occurs subsequent to the unity gain mode readout cycle 630 where during the reset cycle RESET transistor 61 is pulsed ON and $C_{DETECTOR}$ is charged or discharged to reset the voltage at node 601 to $V_G$ while RESET transistor 61 is ON. During the reset cycle, READ transistor 65 is turned OFF, switch transistor 691 is kept OFF, switch transistor 692 is turned OFF and AMP_RESET transistor 681 is kept ON. In a further example of the timing sequence, the amplification mode readout cycle 620 and the unity gain mode readout cycle 630 can be interchanged due to the 'non-destructive' nature of the readout on the input signal.

Figure 8:
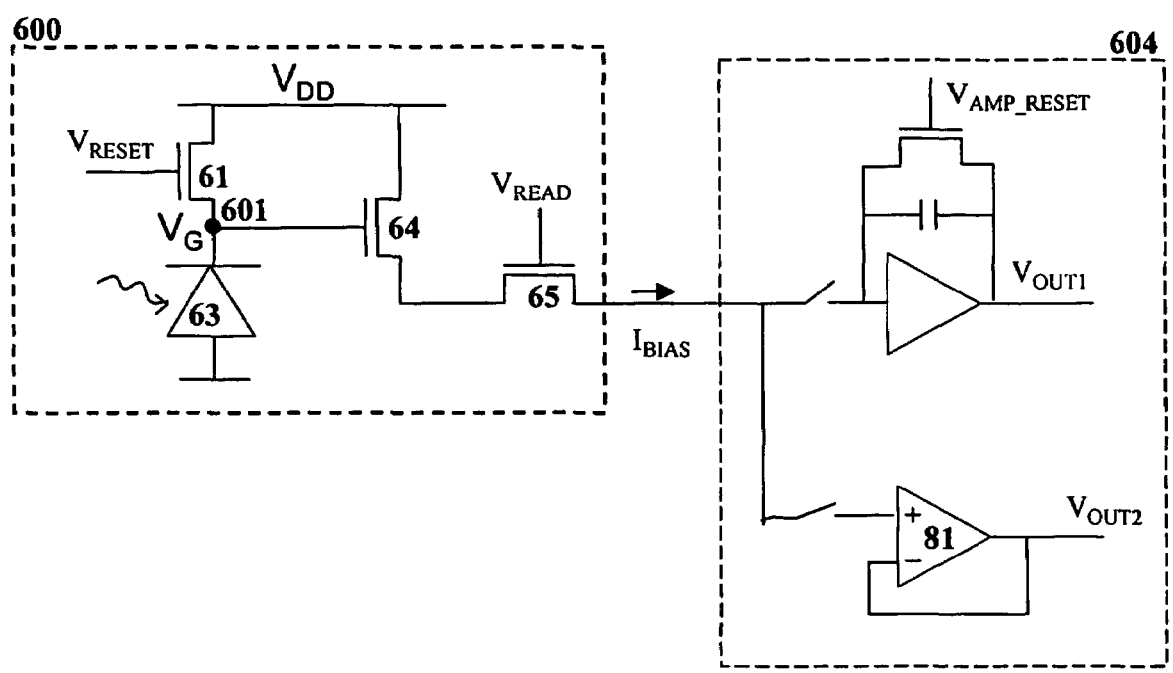
FIG. 8 illustrates a three transistor pixel, dual mode implementation of one embodiment of the present invention.

FIG. 8 depicts another embodiment of the present invention in which the unity gain mode configuration of the embodiment of FIG. 6 is implemented using a voltage amplifier 81 in a follower, or buffer, configuration. It would be obvious to a worker skilled in the art that numerous unity gain mode configurations are possible including various voltage follower and various voltage buffer configurations.

Figure 9:
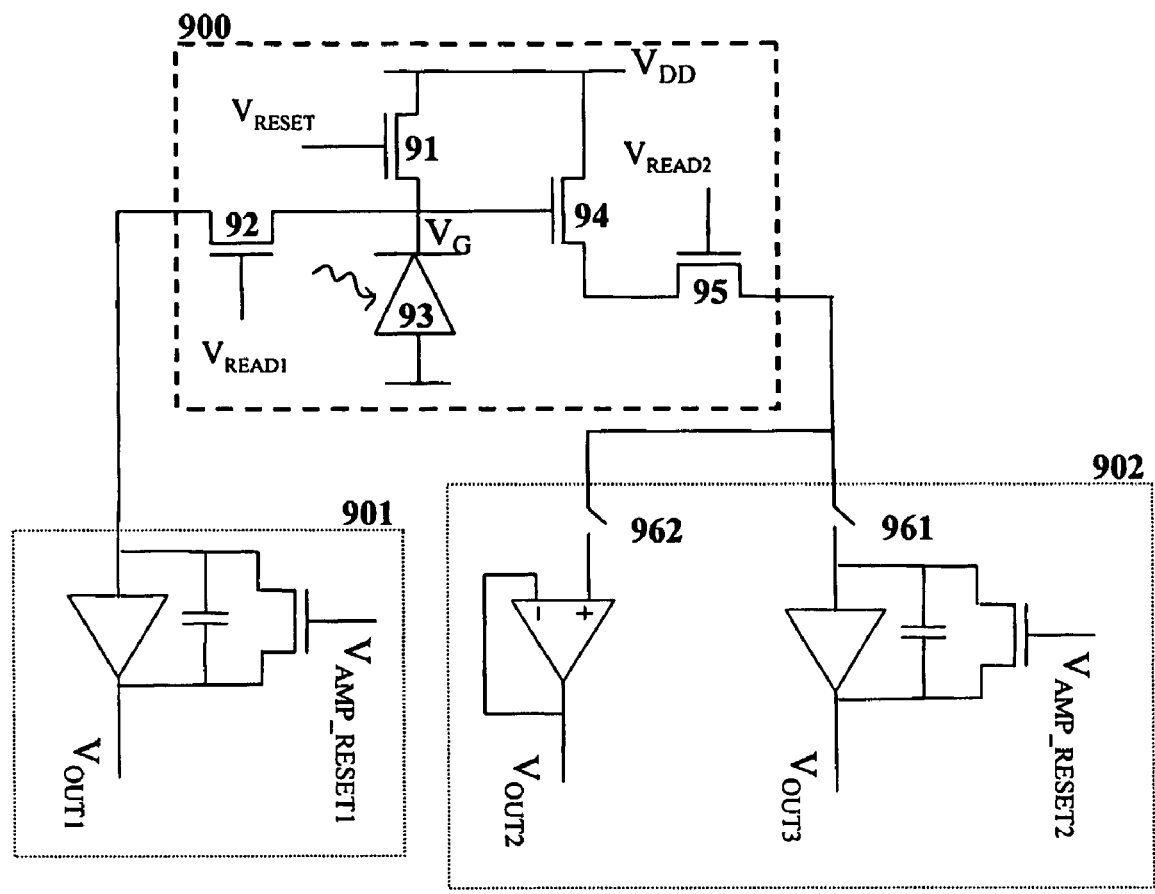
FIG. 9 illustrates a tri mode implementation of one embodiment of the present invention.
Figure 10:
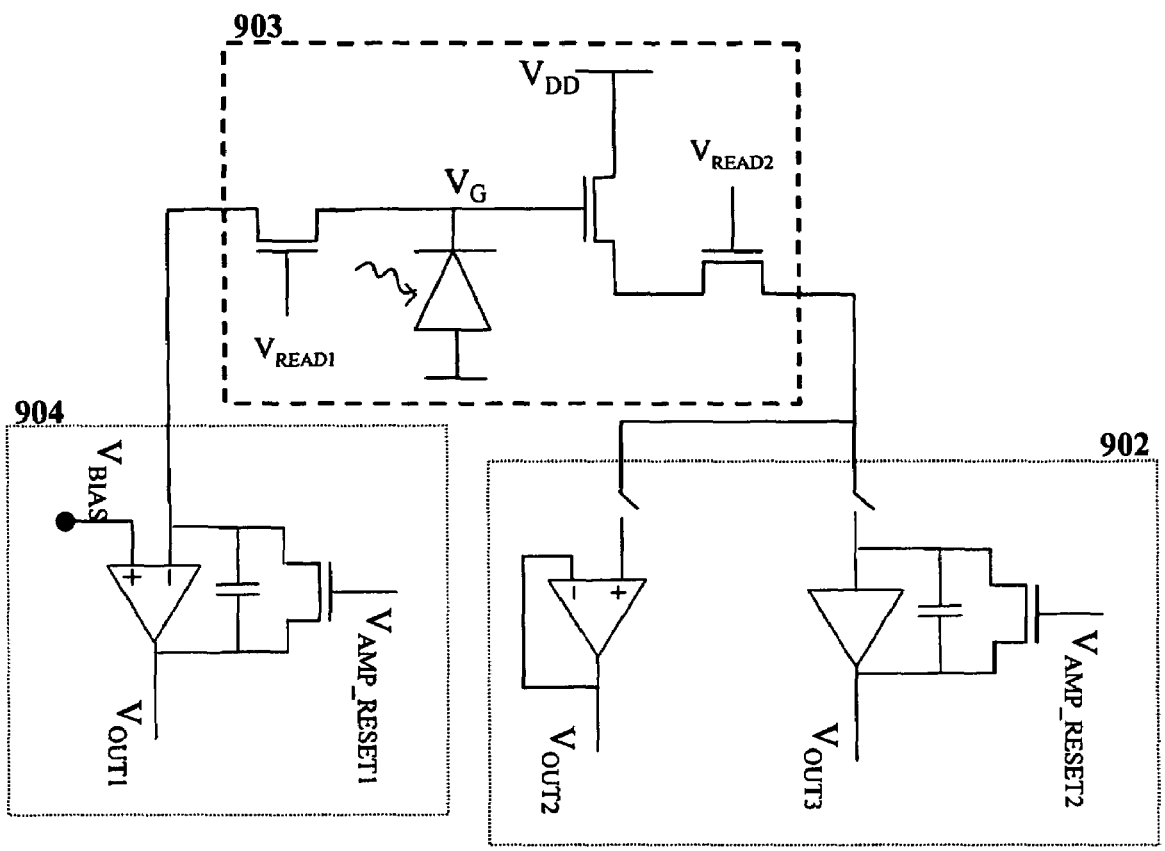
FIG. 10 illustrates a tri mode implementation of one embodiment of the present invention.
Figure 11:
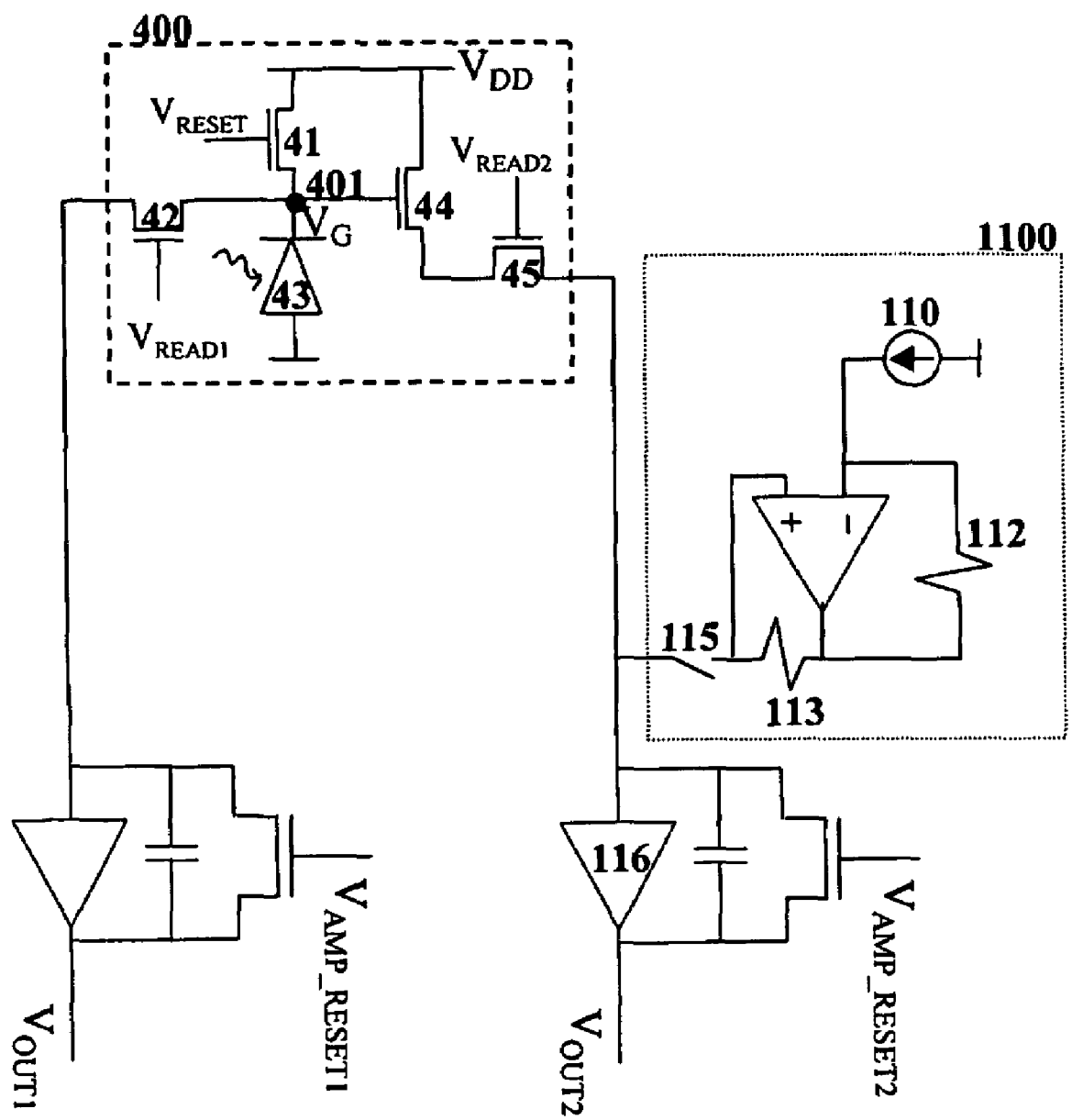
FIG. 11 illustrates the embodiment of FIG. 4a with a current subtraction circuit implemented according to one embodiment of the present invention.
Figure 12:
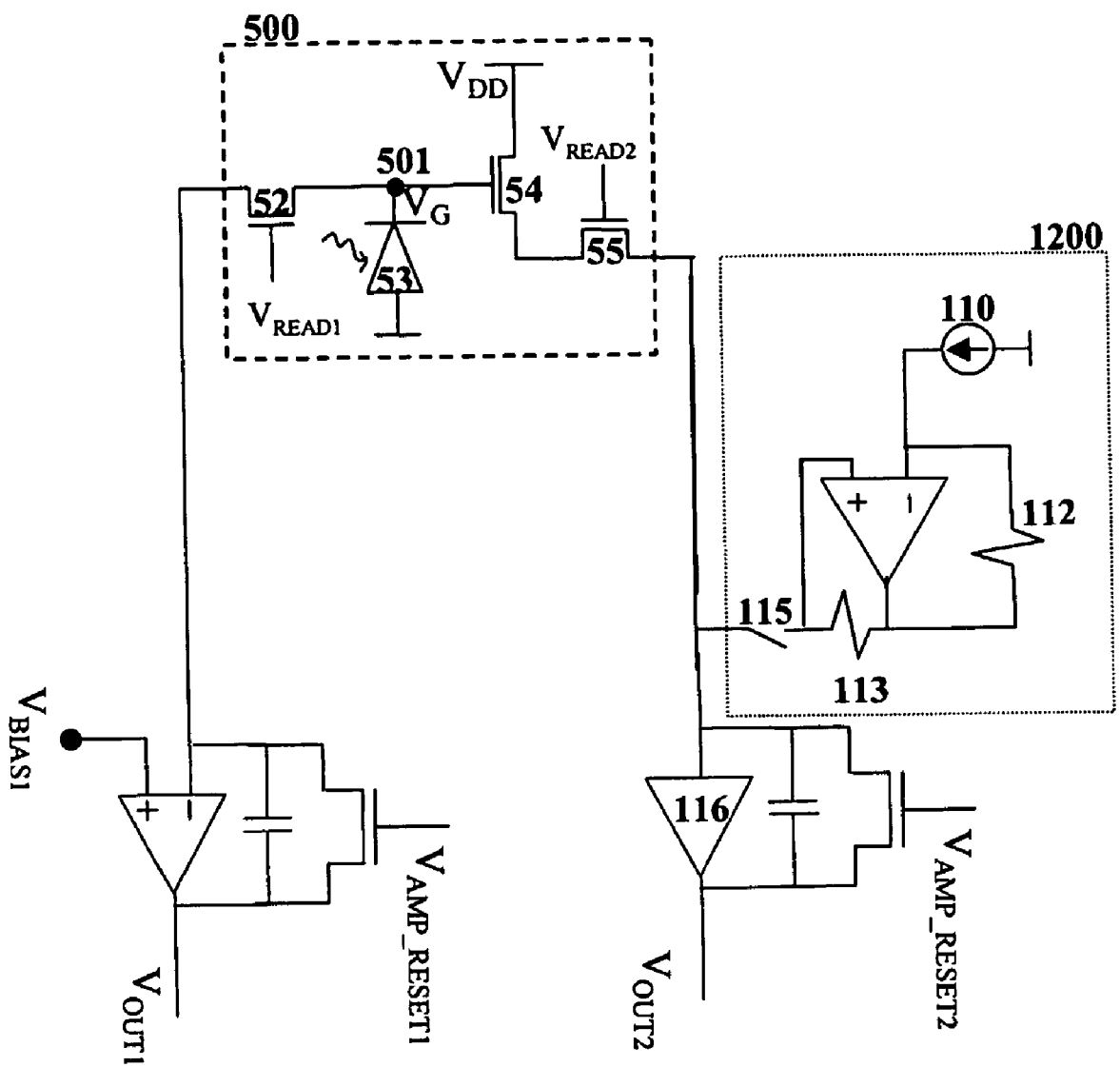
FIG. 12 illustrates the embodiment of FIG. 5a with a current subtraction circuit implemented according to one embodiment of the present invention.
Figure 13:
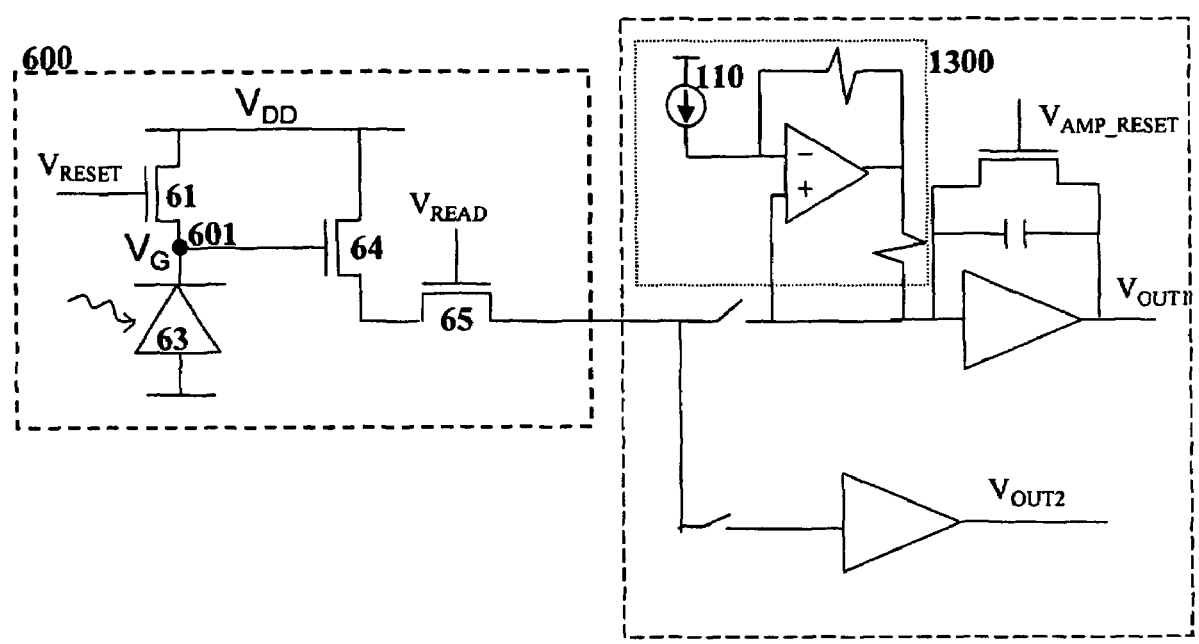
FIG. 13 illustrates the embodiment of FIG. 7a with a current subtraction circuit implemented according to one embodiment of the present invention.
Figure 14:
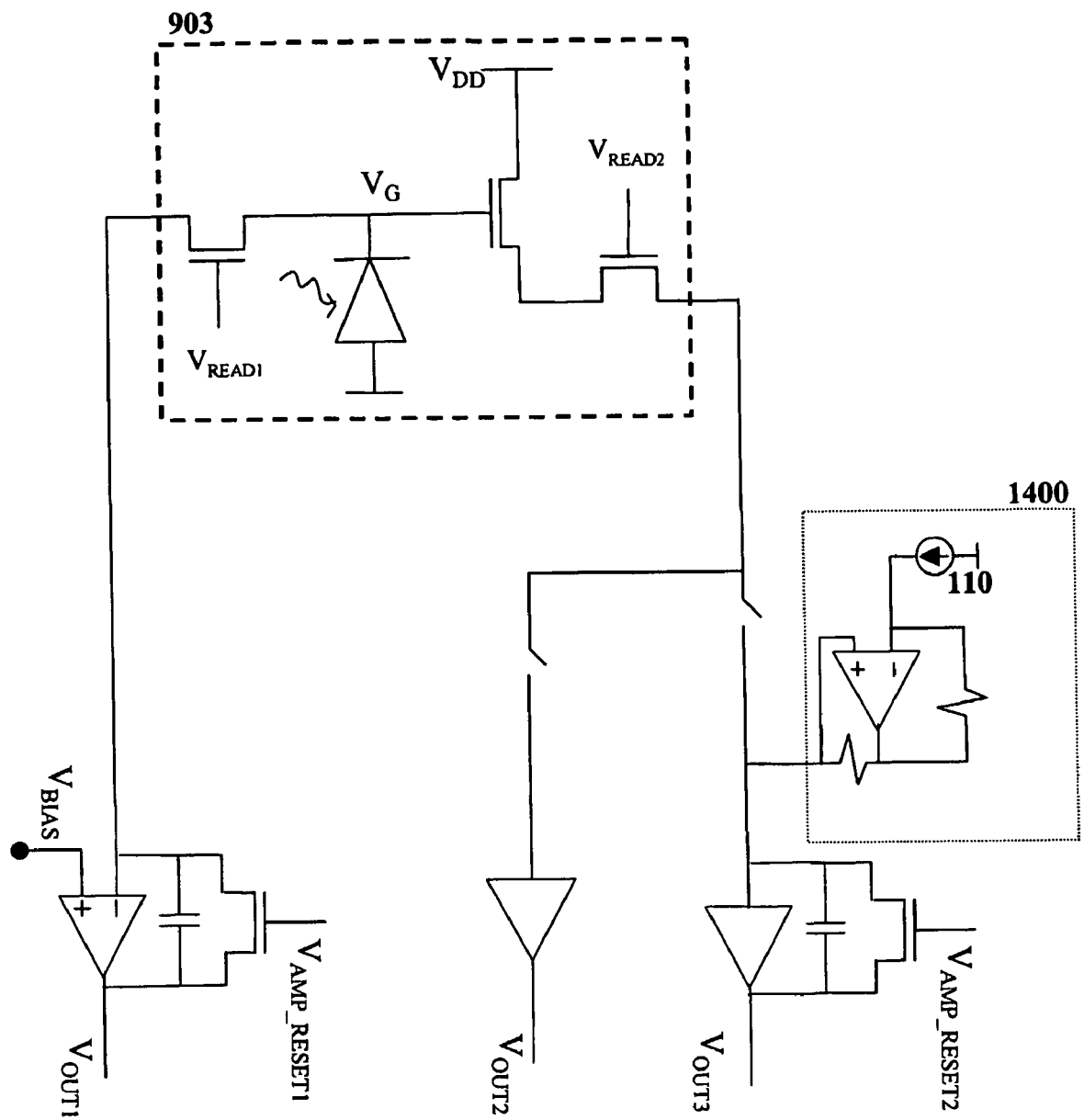
FIG. 14 illustrates the embodiment of FIG. 10 with a current subtraction circuit implemented according to one embodiment of the present invention.

In yet further embodiments of the present invention as illustrated in FIG. 9 and FIG. 10, the input signal can be read out in three independent modes, namely an amplification mode, an active pixel unity gain mode, and a passive pixel unity gain mode, or any combination thereof.

In the embodiment illustrated in FIG. 9 pixel circuitry 900 is similar to pixel circuitry 400 in the embodiment of FIG. 4a. In the embodiment illustrated in FIG. 10 pixel circuitry 903 is similar to pixel circuitry 500 in the embodiment of FIG. 5a. The off-pixel circuitry comprises circuitry 902 that is similar to circuitry 604 in the embodiment of FIG. 8. Circuitry 902 illustrates one implementation of a reconfigurable circuit, however, various other implementations are possible as described earlier with respect to FIG. 6. In addition, circuitry 904 is similar to circuitry 501 in the embodiment of FIG. 5a.

When the sensor operates in the amplification mode, READ1 transistor 92 is OFF, switch 962 is OFF and switch 961 is ON. When in the active pixel unity gain mode, READ1 transistor 92 is OFF, switch 961 is OFF and switch 962 is ON. Lastly, when the sensor operates in the passive pixel amplification mode, switch 961 is OFF, switch 962 is OFF and READ1 transistor 92 is ON.

With current state-of-the-art a:Si:H technology, the use of the amplification mode and passive pixel unity gain mode can be well suited, for example, for real-time imaging applications with largely varying input signals since more rapid readout times may be achieved with these modes of detection compared to the active pixel unity gain mode. The weaker input signals may be detected using the amplification mode while the stronger signals may be detected using the passive pixel unity gain mode. The amplification mode and active pixel unity gain mode can be well suited, for example, for applications where parts of the readout circuitry are interfaced to on-panel or off-panel multiplexers, or where long column output lines are driven and high signal integrity is required. Therefore, such a tri mode embodiment can be useful in applications that require a large dynamic range for real-time imaging as well as very high quality static detection.

The embodiments presented herein are provided as examples and as would be readily understood by a worker skilled in the art, various other embodiments are possible, wherein alternate readout circuitry having different modes of operation can be coupled to form the multimode circuitry as defined herein. For example, a type of circuitry that allows readout to occur in a particular mode can be combined with other types of circuitry that allow readout to occur in alternate modes, for instance, a type of circuitry that allows unity gain mode readout for static readout applications can be combined with unity gain mode readout circuitry for real-time readout applications.

Current Subtraction

Having regard to embodiments of the present invention illustrated in FIG. 4a, FIG. 5a, FIG. 7a, FIG. 9 and FIG. 10, during the amplification mode, the pixel output current comprises $I_{BIAS} \pm \Delta I_{BIAS}$ where $\Delta I_{BIAS}$ is proportional to the small signal detector input voltage change $\Delta V_G$. For a small input signal, a large $I_{BIAS}$ is typically required in order to achieve both a large $g_m$ and $G_i$ thus enabling detection of the desired signal. A large $I_{BIAS}$ however, can cause the off-pixel charge amplifier to saturate at a particular $I_{BIAS}$ thereby limiting the maximum gain achievable.

In one embodiment of the present invention, a current subtraction circuit is implemented in the path of $I_{BIAS} \pm \Delta I_{BIAS}$, the current subtraction circuit introduces a current from an independently programmable current source into the path of $I_{BIAS} \pm \Delta I_{BIAS}$. The current generated by the current source can be programmed such that when the generated current is combined with $I_{BIAS} \pm \Delta I_{BIAS}$, the resulting current is equal to $\Delta I_{BIAS}$, which when subsequently input to the off-pixel charge amplifier will not typically cause saturation of the charge amplifier. In this manner, a large gain may be applied to small input signals while mitigating the potential for saturation of the off-pixel charge amplifier.

FIG. 11, FIG. 12, FIG. 13 and FIG. 14 depict the embodiments of FIG. 4a, FIG. 5a, FIG. 7a and FIG. 10, respectively, each with the addition of an embodiment of a current subtraction circuit 1100, 1200, 1300 and 1400, respectively. Each current subtraction circuit comprises a programmable current source 110, which is used to subtract the current $I_{BIAS}$ from each pixel during the amplification mode. Programmable current source 110 may be on-panel or off-panel. Switch 115 can be used to control the flow of current from the current subtraction circuit 1100 to the rest of the readout circuitry and can be useful when common circuitry is multiplexed. The current reaching charge amplifier 116 is only $\Delta I_{BIAS}$, which is typically small, and its integration will typically not cause saturation of the charge amplifier prematurely. The current flowing from current source 110 is independently programmable via the choice of resistor 112 and resistor 113. In further embodiments, the external current source 110 may be independently programmable using other circuit implementations as would be readily understood by a worker skilled in the art. Therefore, large values of $I_{BIAS}$ can be used to achieve high $g_m$ and $G_i$ values. The ability to achieve high gains of the input signal results in an increase in the dynamic range of the imaging array since even smaller input signals can be detected with use of the current subtraction circuit. Furthermore, in the amplification modes of operation, the need for double sampling may not be required.

Figure 2A:
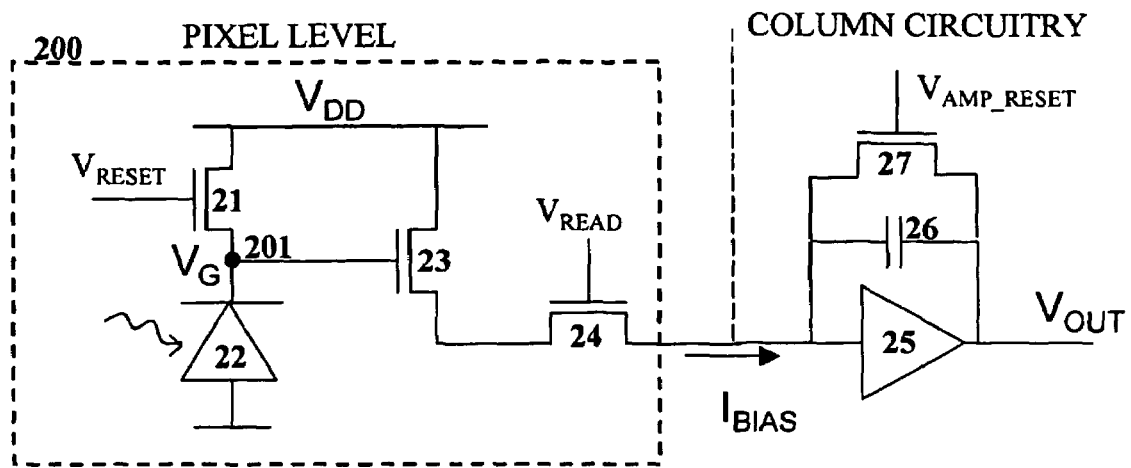
FIG. 2a illustrates a current mediated active pixel sensor (C-APS) according to the prior art.
Figure 2B:
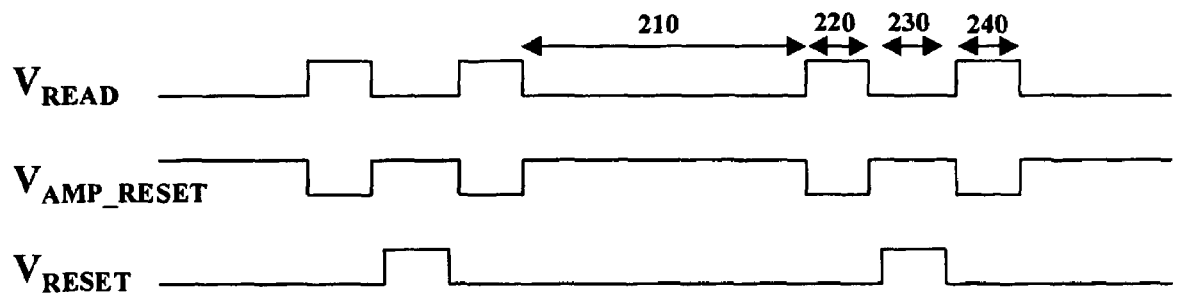
Figure 3:
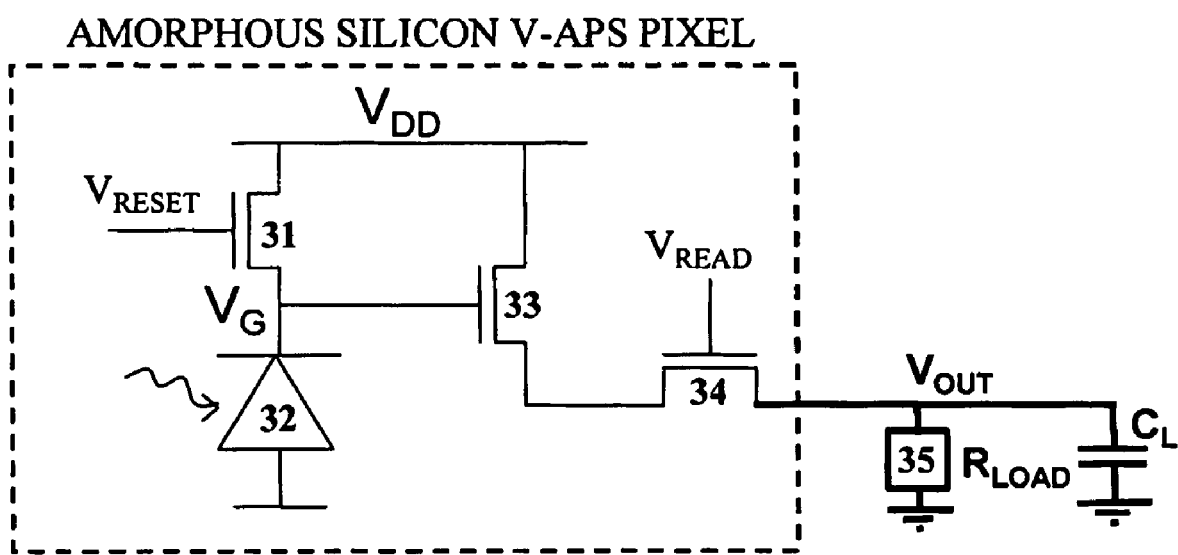
FIG. 3 illustrates a voltage mediated active pixel sensor (V-APS) according to the prior art.

The current subtraction circuit can be used with any imaging architecture in which large output currents limit the dynamic range of the imaging system due to saturation of devices. For example, a current subtraction circuit can be appropriately implemented into the C-APS architecture illustrated in FIG. 2a, or any other imaging architecture as would be readily understood by a worker skilled in the art.

The embodiments of the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A digital imaging apparatus comprising:
   a) a detector for generating a first signal in response to photons incident thereupon; and
   b) multimode readout circuitry coupled to said detector for receiving said first signal and for generating a second signal representative of said first signal, said multimode readout circuitry switchable between two or more modes of operation, a desired mode of operation determined based on characteristics of said first signal, wherein said multimode readout circuitry includes two or more capacitors having varying capacitance values, said two or more capacitors being arranged in parallel and configured to be switched therebetween, thereby providing two or more gains, wherein the multimode readout circuitry generates a second signal representative of said first signal in two or more modes of operation, thereby generating two or more second signals representative of the first signal.

2. The digital imaging apparatus according to claim 1, wherein the characteristics of said first signal include magnitude of the first signal.

3. The digital imaging apparatus according to claim 2, wherein the magnitude is below a predetermined threshold and said desired mode of operation of the multimode readout circuitry includes amplification of the first signal for generating the second signal.

4. The digital imaging apparatus according to claim 1, wherein said multimode readout circuitry is switchable between each of the two or more modes of operation by use of a manual switch.

5. The digital imaging apparatus according to claim 1, wherein said multimode readout circuitry is switchable between each of the two or more modes of operation by use of an automatic switch.

6. The digital imaging apparatus according to claim 5, wherein said automatic switch includes a feedback circuit.

7. The digital imaging apparatus according to claim 5, wherein said automatic switch is responsive to a pre-programmed sequence.

8. The digital imaging apparatus according to claim 1, wherein said readout circuitry further comprises a reconfigurable circuit having two or more configurations, each configuration of the reconfigurable circuit defining a particular mode of operation of the multimode readout circuitry.

9. The digital imaging apparatus according to claim 8, wherein said reconfigurable circuit can be configured to function as a circuit selected from the group comprising a charge amplifier circuit, a voltage amplifier circuit, a voltage buffer circuit, and a load circuit.

10. The digital imaging apparatus according to claim 1, further comprising one or more additional detectors, said one or more additional detectors coupled to the multimode readout circuitry.

11. The digital imaging apparatus according to claim 1, wherein the multimode readout circuitry comprises one or more transistors, said transistors being selected from the group comprising amorphous silicon TFTs, poly-crystalline silicon TFTs, micro-crystalline TFTs, nano-crystalline silicon TFTs and crystalline silicon transistors.

12. The digital imaging apparatus according to claim 1, wherein the multimode readout circuitry includes three modes of operation.

13. A digital imaging system comprising an array of digital imaging apparatuses, each digital imaging apparatus comprising:
a) a detector for generating a first signal in response to photons incident thereupon; and
b) multimode readout circuitry coupled to said detector for receiving said first signal and for generating a second signal representative of said first signal, said multimode readout circuitry switchable between two or more modes of operation, a desired mode of operation determined based on characteristics of said first signal, wherein said multimode readout circuitry includes two or more capacitors having varying capacitance values, said two or more capacitors being arranged in parallel and configured to be switched therebetween, thereby providing two or more gains, wherein a particular group of two or more digital imaging apparatuses has a common portion of the multimode readout circuitry.

14. The digital imaging system according to claim 13, said system further comprising multiplexing circuitry enabling signals to be multiplexed to the common portion of the multimode readout circuitry.

15. The digital imaging system according to claim 13, wherein said multiplexing circuitry includes one or more multiplexers.

16. The digital imaging system according to claim 13, wherein said multiplexing circuitry includes one or more switching circuits.

17. A digital imaging apparatus comprising:
a) a detector for generating a first signal in response to photons incident thereupon; and
b) readout circuitry coupled to the detector for generating a second signal representative of said first signal, said readout circuitry including a current subtraction circuit for generating a desired signal, said readout circuitry combining said second signal and said desired signal, and said readout circuitry generating a third signal representative of the combined second signal and desired signal.

18. The digital imaging apparatus according to claim 17 wherein the readout circuitry is a multimode readout circuitry switchable between two or more modes of operation, a desired mode of operation determined based on characteristics of said first signal.

19. A method for digital imaging comprising the steps of:
a) detecting by a detector photons incident thereupon;
b) generating by the detector a first signal in response to the photons;
c) receiving said first signal by readout circuitry coupled to the detector;
d) generating a second signal representative of the first signal by the readout circuitry, said readout circuitry including a current subtraction circuit for generating a desired signal;
e) combining said second signal and said desired signal;
f) generating a third signal representative of the combined second signal and desired signal; and
g) transferring said third signal to a digital signal processor.

20. A digital imaging apparatus comprising:
a) a detector for generating a first signal in response to photons incident thereupon; and
b) multimode readout circuitry coupled to said detector for receiving said first signal and for generating a second signal representative of said first signal, said multimode readout circuitry switchable between two or more modes of operation, a desired mode of operation determined based on characteristics of said first signal, wherein said multimode readout circuitry is switchable between each of the two or more modes of operation by use of an automatic switch, the automatic switch including a feedback circuit.

* * * * *